US009703668B2

(12) United States Patent
Ryabchun et al.

(10) Patent No.: US 9,703,668 B2
(45) Date of Patent: Jul. 11, 2017

(54) SYSTEM FOR INTERACTING WITH A WEB VISITOR

(75) Inventors: Andrey Ryabchun, Mill Valley, CA (US); Ramesh V. Pattabhiraman, New Albany, OH (US); Derek Barnes, San Jose, CA (US); Mark Scott, Willowdale (CA); James Barnett, Auburndale, MA (US)

(73) Assignee: GENESYS TELECOMMUNICATIONS LABORATORIES, INC., Daly City, CA (US)

( * ) Notice: Subject to any disclaimer, the term of this patent is extended or adjusted under 35 U.S.C. 154(b) by 1219 days.

(21) Appl. No.: 13/293,575

(22) Filed: Nov. 10, 2011

(65) Prior Publication Data

US 2013/0124641 A1    May 16, 2013

(51) Int. Cl.
G06F 15/16    (2006.01)
G06F 11/34    (2006.01)

(52) U.S. Cl.
CPC ...... *G06F 11/3495* (2013.01); *G06F 11/3438* (2013.01); *G06F 2201/86* (2013.01); *G06F 2201/875* (2013.01)

(58) Field of Classification Search
CPC ............. G06F 11/3438; G06F 11/3495; G06F 2201/86; G06F 2201/875
USPC ............... 709/204, 206, 223, 224; 379/93.01
See application file for complete search history.

(56) References Cited

U.S. PATENT DOCUMENTS

| 8,275,796 | B2* | 9/2012 | Spivack | G06F 17/3089 706/45 |
| 2001/0054064 | A1* | 12/2001 | Kannan | G06F 17/30867 709/203 |
| 2004/0111479 | A1* | 6/2004 | Borden | G06Q 10/107 709/206 |
| 2005/0273854 | A1* | 12/2005 | Chess | G06F 21/577 726/22 |
| 2006/0230058 | A1* | 10/2006 | Morris | 707/102 |
| 2008/0222531 | A1* | 9/2008 | Davidson | G06Q 10/107 715/736 |
| 2012/0084133 | A1* | 4/2012 | Ross et al. | 705/14.27 |
| 2012/0296682 | A1* | 11/2012 | Kumar | G06Q 10/00 705/7.11 |

\* cited by examiner

*Primary Examiner* — Davoud Zand
(74) *Attorney, Agent, or Firm* — Lewis Roca Rothgerber Christie LLP

(57) ABSTRACT

A system for interacting with a person browsing a web site has an Internet-connected server and a connected data repository, and software executing on the server from a non-transitory physical medium. The software provides an identity function identifying the person, a selection function checking the data repository for stored information regarding the identified person, including any tracking rules associated with the identified person, and one or more tracking functions monitoring and recording behavior of the person browsing the web site. The one or more tracking functions follow the tracking rules, if any, associated with the identified person in monitoring and recording behavior of the browsing person.

20 Claims, 4 Drawing Sheets

SYSTEM FOR INTERACTING WITH A WEB VISITOR

CROSS-REFERENCE TO RELATED DOCUMENTS

N/A

BACKGROUND OF THE INVENTION

1. Field of the Invention

The present invention is in the field of telephony, including Internet protocol network telephony (IPNT), and pertains particularly to methods and apparatus for collecting, aggregating and exploiting information derived by tracking behavior of persons visiting Web pages, and pre-stored information regarding the same persons.

2. Discussion of the State of the Art

In the art of telephony, call centers exist for the purpose of processing transactions and general servicing of customer's needs. Modern call centers often use proactive methods to reach out to persons who may be potential customers in order to anticipate needs of such persons and to illicit engagement of those persons in transaction and or service-based processes hosted by the call center.

Methods known to the inventors for initiating proactive contact include proactive telephone contact based on some information already known about the person. For example, a person may click on a product description to learn more about a product advertised on a Web page. When the call center learns of this action by the person, an automated offer may be delivered to that person (typically a pop-up message) that asks the person if they would like to chat with an agent, receive a call, or be redirected to an order page, for example.

One important factor in such outbound proactive campaigns is the richness of information that can be obtained about the person. Such information types may include Web page navigation activities and results of searches performed through a search engine accessible through the Web page being monitored. Several challenges exist with respect to making proactive contact more efficient and therefore more successful relative to the ratio of contact to closing of transaction processes.

A limitation that is persistent in call center data aggregation is that when a potential customer becomes a proactive target, generally only a very limited picture of that customer's behavioral profile and preference profile exists in the knowledge banks of a call center system. For example, a customer might be interested in a specific product as evidenced by the customer clicking on the product description. This activity may be sufficient to launch a proactive contact attempt that fails because the customer was recently unemployed and cannot purchase the product.

There are existing Web monitoring that gather and store data about Web visitors for purposes including proactive contact. One problem with these systems is that they typically aggregate information rather than store it on an individual basis. Another problem is that the information most often is not available in real-time. Moreover, existing proactive engagement systems monitor individual visitors and respond in real-time, however, the only channel offered is Web chat and information about the individual visitors is not maintained after contact, so all knowledge of the Web visit is lost once the visitor leaves the site. In particular, information about the Web visitor is not available when he or she contacts the contact center by other channels.

Therefore, what is clearly needed is a system that is highly personalized, that has access to existing information about individual persons, that tracks online behavior, adds that data to existing data, and uses the results proactively in interacting in many ways with the subject persons. A system such as this would provide a fuller picture of the customer's interests and behaviors no matter what channel the customer uses for the next visit to the Web site or hosting call center.

SUMMARY OF THE INVENTION

The problem stated above is that better understanding of a current Web visitor's state and status deduced through dissemination of data known about the visitor at the time of the Web visit is desirable for a call center system, but many of the conventional means for collecting and understanding data about such visitors, such as Web navigation monitors, also create an incomplete picture of the current "real" state of the visitor. Moreover, the ability to have instant access to rich data about potential and repeat customers during customer contact with a business in a channel independent manner is desirable, but many of the means for obtaining and preserving such information, such as with traditional database storage and retrieval systems, create inefficiency and are not consistent in terms of availability across some available contact channels.

The inventors therefore considered functional components of a Web-monitoring system, looking for elements that exhibit interoperability that could potentially be harnessed to provide tools for gathering information about a Web visitor, but in a manner that would not result in an singular profile of the visitor relative to just the captured information.

Every proactive outreach campaign is driven by a desire to increase the level of transactions processed for a business, one by-product of which is an abundance of new and potentially repeat customers for the business. Many such campaigns employ Web-monitoring systems, data storage and retrieval systems, and outbound contact systems to engage potential customers and service them based on adequate knowledge of customer intent and preferences.

The present inventors realized in an inventive moment that if, at the point of engagement with a customer, rich information about the customer including recent site activity and past historical information were immediately available in summary form to the agent servicing the individual, significant improvement in transaction closing rate might result.

The inventors therefore constructed a unique and adaptive Web-monitoring system including persistent data storage and data retrieval methods for proactive contact of Web visitors that allowed for better utilization of data known and obtained about the visitor for the purpose of more intelligent customer targeting in an outbound campaign and more intelligent service upon subsequent customer contact with the business regardless of contact channel. A significant improvement in the transaction close ratio results, with no impediment to efficiency or service quality created.

Accordingly, in one embodiment of the present invention a system for interacting with a person browsing a web site is provided, comprising an Internet-connected server having a connected data repository, and software executing on the server from a non-transitory physical medium. The software provides an identity function identifying the person, a selection function checking the data repository for stored information regarding the identified person, including any tracking rules associated with the identified person, and one or more tracking functions monitoring and recording behavior of the person browsing the web site. The one or more tracking functions follow the tracking rules, if any, associated with the identified person in monitoring and recording behavior of the browsing person.

In one embodiment of the invention the stored information in the data repository comprises one or both of demographic information and transaction history regarding the identified person, and behavior recorded on the web site is stored in the data repository along with the demographic information and transaction history. Also in one embodiment, if no information is discovered in the data repository regarding the identified person, a default set of tracking rules is followed, and data is stored associated with the identified person as a result.

In some embodiments the system further comprises a call center hosted by an enterprise, the call center providing messaging functions including telephony functions, wherein the behavior recoded on the web site, along with any other information regarding the identified person is used to determine and initiate a messaging transaction with the identified person.

In various embodiments candidate web sites are enabled for tracking visitor behavior by inserting a script into the source code, the script readable by a browser application. The scripts may be one of a Java script or an Action script. The recorded behavior may be one or more of navigation information, search result information, comparative pricing information, form fill information, and shopping cart interaction information. The messaging functions may be one or more of include sending an email, sending a pop-up message, sending a short mail service (SMS) message, launching a Chat session, placing a telephone call, and presenting an offer.

In another aspect of the invention a method for interacting with a person browsing a web site is provided, comprising the steps of (a) identifying the person browsing the web site by software executing from a non-transitory physical medium coupled to a tracking server; (b) checking in a coupled data repository for information regarding the identified person and any pre-stored tracking rules associated with the identified person; (c) using the tracking rules found, if any, to monitor and record behavior of the person browsing the web site, and (d) in the event no information regarding the identified person is found, tracking web behavior of the person using a default set of tracking rules, and storing the result associated with the identified person.

In one embodiment of the method wherein pre-stored information and tracking rules are found for the identified person, there is a step for storing the tracking results in the data repository with the existing information for the identified person. If no information is discovered in the data repository regarding the identified person, a default set of tracking rules is followed, and data is stored associated with the identified person as a result.

In various embodiments a call center is a part of the system, and the call center provides messaging functions, including telephony functions, and the behavior recoded on the web site, along with any other information regarding the identified person is used to determine and initiate a messaging transaction with the identified person. Candidate web sites are enabled for tracking visitor behavior by inserting a script into the source code, the script readable by a browser application. The script may be one of a Java script or an Action script.

In some cases the recorded behavior includes one or more of navigation information, search result information, comparative pricing information, form fill information, and shopping cart interaction information, and in some cases the messaging functions include one or more of include sending an email, sending a pop-up message, sending a short mail service (SMS) message, launching a Chat session, placing a telephone call, and presenting an offer.

BRIEF DESCRIPTION OF THE DRAWING FIGURES

DETAILED DESCRIPTION

The inventors provide a unique system and methods for monitoring Web visitors and combining real-time monitoring results with existing data known about the visitors to form more intelligent proactive interaction with the visitor, and other management of operations of, for example, a call center. It is emphasized, that although the invention in several embodiments is described with reference to merchant sites, where a web visitor may be reviewing products and services for possible purchase, the invention is not limited to such sites. The functionality of the invention is applicable to web activity of persons with all sorts of sites, such a blogs, social interaction sites like Facebook™, and any other sort of site where a visitors interaction may be tracked. The present invention is described in enabling detail using the following examples, which may describe more than one relevant embodiment falling within the scope of the present invention.

Figure 1:
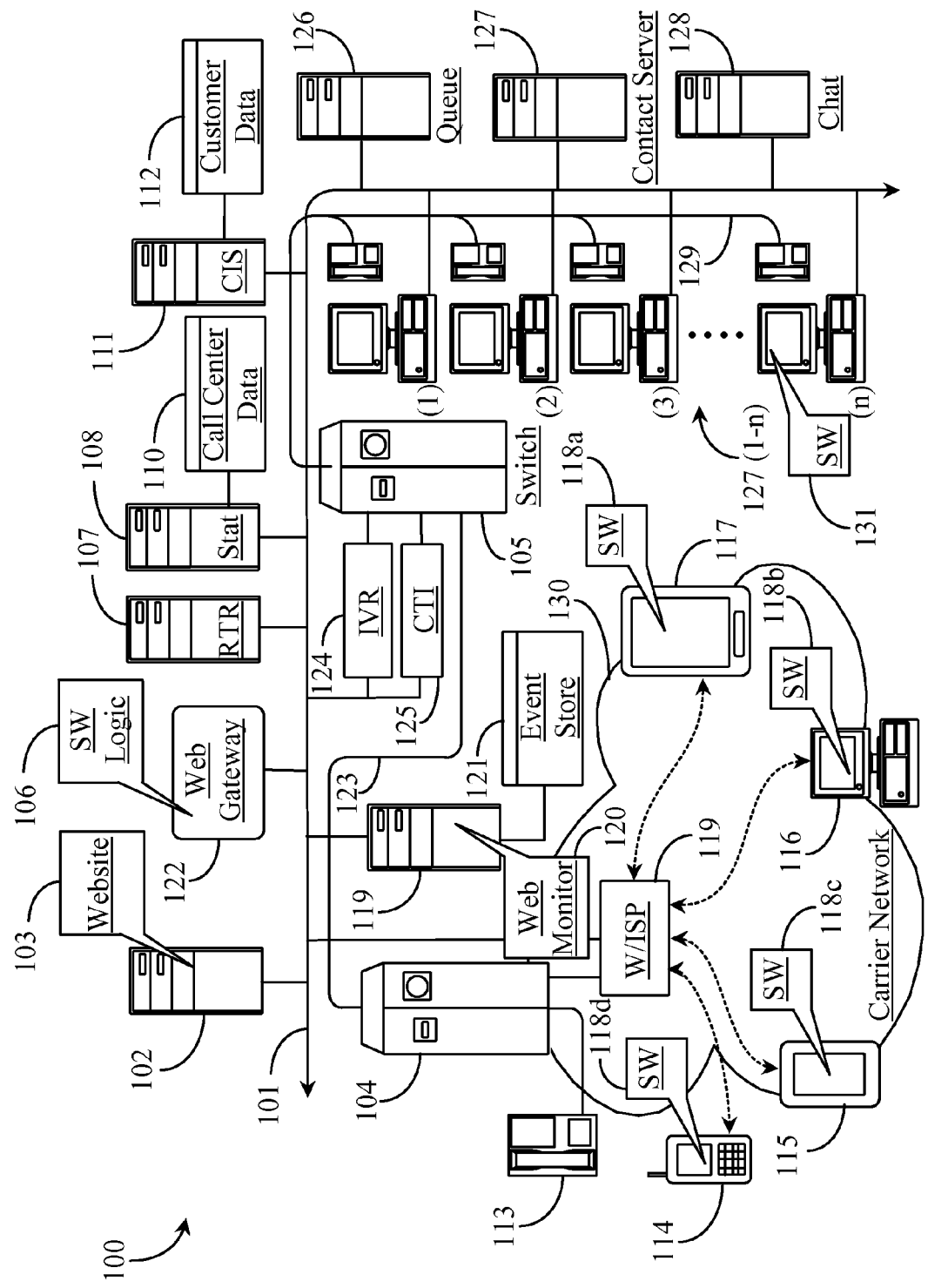
FIG. 1 is an architectural overview of a communications network supporting Web monitoring and proactive contact of Web visitors according to an embodiment of the present invention.

FIG. 1 is an architectural overview of a communications network 100 supporting Web monitoring and proactive interaction with Web visitors according to an embodiment of the present invention. Communications network 100 in this example includes a domain of a contact center. In this example, the call center is represented by a data network backbone 101, which supports both call center equipment and at least ell one Internet-connected server 102. Backbone 101 represents both Internet network and local area network (LAN) functionality and includes all of the equipment, lines, and access points that make up the Internet as a whole including connected sub-networks. Therefore, there are no geographic limitations to the practice of the present invention.

Network backbone 101 describes both the Internet network and a LAN network supporting call center equipment and functionality. Internet server 102 is a Web page server and includes a non-transitory physical medium adapted with all of the software and data required to enable function as a Web page server. Web server 102 includes a portal Web site 103. Web site 103 may be hosted by a third-party Web-hosting service or by a business entity marketing products and services to consumers. In this case, the contact center domain represented by network backbone 101 hosts Web server 102 and Web site 103.

Network backbone 101 supports a call center switch 105. Call center switch 105 is a telephony switch functioning as a central switch for agent level routing within the center. Switch 105 may be an automated call distributor (ACD), a private branch exchange (PBX), or an IP-based software switch without departing from the spirit and scope of the present invention. In this example, switch 105 is enhanced for call distribution intelligence by a computer telephony integrated (CTI) processor 125 connected to switch 105 via CTI link. CTI processor has direct connection to LAN 101. CTI processor 125 provides intelligent process control over switch 105 Switch 105.

Switch 105 is additionally enhanced for customer screening by an interactive voice response (IVR) unit 124. IVR unit 124 intercepts callers calling into the call center domain and determines caller identification and caller intent to help route calls to appropriate destinations within the call center. Switch 105 may accept Internet-sourced calls as well as telephone network sourced calls. A telephony-enabled carrier network 130 represents any wired or wireless digital network capable of supporting telephony communications. Carrier network may be a cellular network or a segment of the public switched telephony network (PSTN). A telephone switch 104 is illustrated within network 130 and is connected to central switch 105 in the call center domain by a telephone trunk 123. Like switch 105, switch 104 may be and ACD, PBX, or a soft IP-based switch without departing from the spirit and scope of the present invention.

Carrier network 130 supports several different Internet-capable appliances 114, 115, 116, and 117. Appliance 117 is an I-Pad type appliance. Appliance 116 is a personal computer. Appliance 115 is an android or smart phone, and appliance 114 is a cellular telephone. A plain old telephony service (POTS) telephone 113 is illustrated and represents any telephone connectivity through carrier network 130, which may support POTS telephone service. A wireless or wired Internet Service Provider (W/ISP) 119 is illustrated within carrier network 130 and is adapted to provide Internet connection services to appliances 114-117. W/ISP has connection to network backbone 101 via an Internet access line. Appliances 114, 115, 116, and 117 all connect to server 102 through W/ISP 119.

Various methods for connecting to the Internet are assumed possible in this example, including but not limited to Internet Services Digital Line (ISDN), Dial-up Modem, Cable Modem, Satellite, Wireless Fidelity (WiFi) and others. Therefore, W/ISP represents general Internet connectivity in this embodiment. Each appliance 114-117 is connected to Internet server 102 and is logged into or otherwise accessed a Web site 103. Web site 103 represents a customer access point for customers or potential customers (Web visitors) of a business entity served by the call center.

Backbone 101 supports a Web monitoring server 119. Web monitoring server 119 includes a non-transitory physical medium that contains all of the data and software required to enable Web monitoring of visitors to Web site 103. Software 120 is active whenever visitors access a tracked Web page of Web site 103. In one embodiment a tracking code is embedded in each Web page of Web site 103 that is monitored for visitor activity. The tracking code may be a Java Script. In one embodiment where Flash Web pages are provided, the tracking code might be an Action Script. The script defines what type of activity by a visitor is monitored including access of site features, navigation on Web pages and between Web pages, search activity, and any interaction with product ads, price comparison widgets, electronic shopping facilities, electronic forms, and so on.

Each appliance 114-117 includes software instances 118a through 118d obtained by the client appliances through execution of the tracking code via respective browser applications running on those appliances. Software instances 118 a-d represent downloaded Web-monitoring modules including notification and engagement modules that enable proactive communications such as email messages, short message service (SMS) messages, session initiation protocol (SIP) calls and messages, among other proactive communications. More detail about software sub-components of SW 120 will be provided later in this specification. Server 119 includes an event store 121 in this example. Event store 121 is adapted to store monitored Web events resulting from specific visitor interactions with Web site 103.

In one embodiment, Web monitor 119 includes intelligence for assigning business relevancy factors to detected Web events for the purpose of determining which events will be forwarded to call center facilities. In another embodiment, Web monitoring software 120 simply passes all detected Web events for each visitor at the site to call center software for further processing within the call center. Event store may, in one embodiment, function as a queue of sorts for temporarily holding events before passing them on to the call center. In some more sophisticated embodiments web monitor 120 cooperates with call center servers and intelligence, such as CIS 111 and Stat Server 108, to focus web monitoring activity for specific persons. For example, business relevancy factors may be personalized for individuals, such that for one person web behavior may be ignored, for another, only certain activity may be tracked and recorded for use, and for some select few, every activity, change in activity, duration of activity and so on may be carefully monitored and recorded to be used in interaction with that person. In addition this sort of personal configuration may be used to determine what uses may be initiated for tracked activity for specific persona, and what tracked information may be stored for future use. Backend data management may be used as well to sort and update information regarding specific persona. For example, trends in behavior over time may be used to discard older information and reorganize newer information.

Network backbone 101 supports a Web gateway 122. Web gateway 122 includes a non-transitory physical medium that is adapted to contain all of the software and data required to function as an intercepting Web gateway. Gateway 122 is adapted as a front line intercept of Web events forwarded into the call center from Web monitoring server 119. In this example, Web gateway 106 includes software and logic 106 that enables a proactive notification service and a proactive engagement service. In one embodiment, software and logic 106 enables the gateway to determine with the aid of call center statistics, what events should be handled immediately, what events can be handled later, and whether live assistance is recommended. More detail about sub components of software and logic 106 will be provided later in this specification.

Network backbone 101 supports several call center agent-operated workstations 132 (1-n). In this example, only minimum equipment is illustrated for the purpose of simplicity, namely a network-connected PC and a telephone. The telephones in each agent-operated workstation are connected to central switch 105 via internal telephone wiring 129. In one embodiment, the telephones are LAN-connected PBX handsets. In another embodiment, headsets may be used in conjunction with PC-connected telephony applications. In one embodiment, Voice over Internet Protocol (VoIP) and POTS calls are supported. Agent-operated workstations 132 (1-*n*) may represent any grouping or groups of individual agents working interactions within the call center domain. In one embodiment, agents may also work from remote locations and may connect to call center support services through a carrier network like network 130 without departing from the spirit and scope of the present invention.

Network backbone 101 supports a variety of call center nodes. Network backbone 101 supports a live chat server 128. Chat server 128 includes a non-transitory physical medium adapted to contain all of the software and data required to enable function as a chat server. Chat server 128 may, in one embodiment, be used in proactive invitation to Web visitors where such proactive invites are deemed appropriate based on processed Web events of visitors detected through Web monitoring. Network backbone 101 supports an Internet Protocol router 108. Router 108 includes a non-transitory physical medium that is adapted to contain all of the software and data required to enable function as a digital data router. Router 108 may be utilized for routing interactions such as email, messaging, VoIP calls, and so on internally within the call center workforce.

Network backbone 101 supports a statistics server 108. Statistics server 108 includes a non-transitory physical medium that contains all of the software and data required to enable function as a statistics server. Statistics server 108 serves call center real time states and statistics such as agent availability, call handling time, estimated waiting time in queue, and other statistical information deemed important to call center function. Statistics server 108 includes a data repository 110 adapted to contain all of the statistical call center data for service to subscribing nodes.

Network backbone 101 supports a customer intelligence server 111. Customer intelligence server 111 includes a non-transitory physical medium adapted to contain all of the software and data required to function as a customer intelligence server. Server 111 has connection to a data repository 112 that is adapted to contain data about customers of the call center. It is important to note herein that the call center of this example may contract with a number of businesses or it may handle interactions of a single business. Therefore, customer information held within repository 110 may source from customers loyal to different businesses that are served by call center 101.

Network backbone 101 supports an agent queue 126. Queue 126 includes a non-transitory physical medium that contains all of the software and data required to enable function as a live queue. In one embodiment, queue 126 is shared by agents operating workstations 132 (1-*n*). In another embodiment, there are a number of dedicated queues for servicing different types of interactions. In this example, queue 126 is a universal interaction queue and can notify agents of any type of call center interaction that may be pending in queue. Network backbone 101 includes a contact server 127. Contact server 127 has a non-transitory physical medium that contains all of the software and data enabling function as a proactive contact server. Server 127 includes a dialer for placing outbound telephone calls to customers and potential customers. Server 127 may also be adapted for sending proactive digital messaging.

In one embodiment of the present invention, Web site visitors operating appliances such as appliances 114-117 access Web site 103 hosted on server 102 through W/ISP 119. Monitoring server 119 with the aid of software 120 monitors each visitor on Web site 103. Each appliance 114-117 downloads, by virtue of a browser application, all of the required client-side components for Web monitoring, notification, and engagement support. This download occurs immediately after the tracking code has been executed by the browser and is transparent to the users. When a user performs an action like clicking on a product description, for example, the client-side monitoring component sends the specific data for that event upstream to the Web monitoring server 119. Server 119 may pass the event on to the call center (Web gateway 122), or may cache or queue the event in event store 121 for later processing. In one embodiment, high-level events representing a high probability of a transaction are forwarded immediately to the call center while low-level events not requiring live service may be stored in event store 121.

High-level events for each visitor may be forwarded immediately to Web gateway 122. Web gateway 122, with the aid of software/logic 106 looks at events for each Web visitor and determines if there are any other pre-known data about those visitors held within, or otherwise accessible to the call center. A Web visitor may be a returning customer who has a customer profile including previous recorded history with the call center including previous monitored events and past interactions with the center. A Web visitor may be a newcomer or first-time visitor. In this case, the call center may not know the customer or have knowledge of any data available about the potential customer.

Many embodiments of the present invention rely on establishing identity, or at least an assumed or pseudo-identity for a person browsing the web site. There are actually three levels of identity basis: (1) Anonymous, in which the identity of the browsing person is unknown and there is no way to guess; (2) an assumed identity based on perhaps cookie association. That is, a same person may be assumed after an anonymous visit when the same person returns to the web site. In this scenario the system in some embodiments might open a profile for the browsing person associated with the cookie identification, and rules and procedures may be provided for that person based on this pseudo-identification. At some later time, when a more secure identification may be established the profile, including evolved procedures, may be associated with the actual identity. (3) Authenticated. This is the case where a person logs into the web site, and is authenticated as the actual person, which may then be associated with a profile and pre-programmed and evolved treatment.

In one special embodiment there is a feedback loop from the web page to the tracking system that fine tunes rules and procedures according to the browsing person's behavior. This updating may be facilitated by special general or identity-based rules that change the tracking and recording procedures according to specific behavior the person may exhibit on the web site.

In the first case mentioned above according to one embodiment, Web gateway 122 aided by software/logic 106, which may include an event filtering engine (not illustrated) may access the customer's profile and most recent history relative to prior contact center contacts with that customer. Traditional identification technologies such as Web cookie exchange and Login authentication procedures may be used to identify repeat customers. The event or events received at gateway 122 may be analyzed or filtered for relevancy in light of past customer history with the call center. This process may be driven by automated algorithmic processing against a set of configurable rules to determine a recommendation for proactive contact for that customer. Web gateway 122 may also be enhanced through software/logic 106 to access call center availability statistics for live agents operating from workstations 132 (1-*n*). In this embodiment, Web gateway may subscribe to statistics server 108 and customer intelligence server 111.

In some embodiments, as described briefly above, intelligence at the web monitor, upon determining identity for a visitor, may access a predetermined monitoring algorithm for that particular visitor, and apply that algorithm in collecting behavioral information. In this manner the interactions with a visitor may be highly personalized. In addition the particular algorithm for a particular person may be periodically updated as well to further maximize results and efficiency. This personalization serves, among other functions, to minimize the computer power needed to do the monitoring, which will be highly selective, rather than collecting everything and sorting it out later.

Depending on the particulars of visitor-monitored events, and the combinational analysis of historic data and instant data, Web gateway 122 may recommend live assistance through voice call or chat with a live agent. Additional recommendations may take the form of offers like discounts on products or services, extension of warrantee, collection of fees owed, sending email or advertisements, or even adjustment of monitoring parameters. Further, the addition of new information to a person's personal file over time allows evolution of business processes on a personal, individual level.

In one embodiment, Web gateway 122 passes high-level events and accessed data onto a more powerful workflow engine (not illustrated). Such an engine may be provided within contact server 127, for example. In this embodiment, the gateway does not perform processing to determine the recommended type of contact action to pursue for a given visitor. In either case, the additional data acquired from Web monitoring and any new results of subsequent proactive contact may be updated to that visitor's persistent information resident in customer data repository 112. In this way, the most recent and relevant information about the customer is known by the call center and may be accessed regardless of the channel the customer uses next to access call center services so long as identification of that customer is known at the time of contact.

An instance of software 131 is illustrated on the PC of agent-operated workstation 132 (*n*). Software 131 is an agent desktop interface that is adapted to display, via a displayable user interface, the customer information about a customer at the time of contact with that customer. Software 131 is browser-based in a preferred embodiment, but can also be provided in the form of a standalone application. In one embodiment it is part of an agent desktop application provided to aid the agent in assisting the customer. If the contact center determines, based on visitor activity analyzed in combination with visitor history that a specific form of proactive contact is justified, the system locates a suitable agent with suitable skills relevant to the proposed contact. The system then forwards the customer or visitor identification and the most recent period of activity and event data so the agent has everything that is required to better service the customer in the pending interaction.

By combining information history with currently-monitored activity, the agent may better ascertain how best to serve the customer. For example, the past history of a customer may suggest several service calls relative to a specific model of router. Monitored Web events may suggest that the customer is now performing price comparison on an upgraded router. Therefore, the system may recommend a proactive offer to the customer to purchase the upgraded router at a discount based on a high probability of a sale.

It is noted herein that if the same information takes into account that the customer is currently behind in payments for the router associated with the high rate of service calls, then the proactive action recommended by the system to service the customer may be limited to a lower priority action such as a Web page redirection from the advertisement for the upgraded router the product page that describes the upgraded router in more detail, which includes a shopping cart and a transaction process. The customer may then be prompted to revisit his or her account page to update their existing account status before a transaction can be completed. In one embodiment, a Web event show a visitor has abruptly abandoned a shopping cart with a router and accompanying software package listed in the cart. The system may recommend, after conferring that the customer is a good payer, a call back from a live agent to aid the customer further in making a transaction. For example, a pop-up message may be displayed on the customer appliance indicating the state of the abandoned shopping cart and asking the customer if a live agent could help with the transaction.

The context of the rules and how they may apply to monitored Web events depend on the nature of the business environment and are therefore configurable and customizable. For example, a customer may be filling out an online loan application for purchasing a boat. A Web event may indicate that the customer paused or quit entering data in the form where specific information was asked such as social security number. A proactive contact offer may then be sent to the customer for accepting a high priority inbound call guaranteeing first in queue for a live agent so that the exchange of information can be achieved over the phone instead of through the Web site. There are many possible scenarios.

Figure 2:
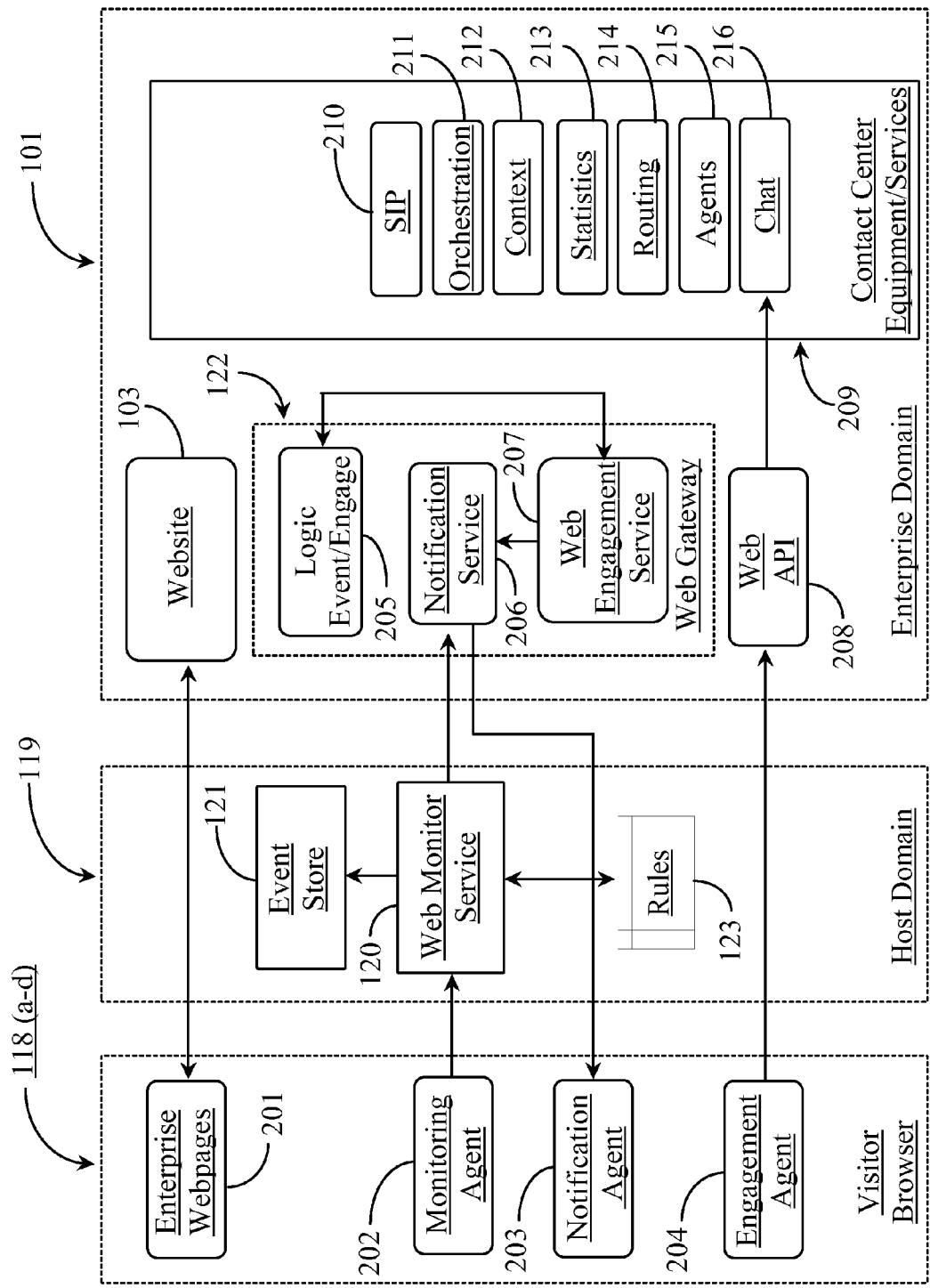
FIG. 2 is a block diagram illustrating components of software logic 106 and of Web monitor software 120 of FIG. 1 according to the embodiment of FIG. 1.

FIG. 2 is a block diagram illustrating components of software logic 106 and of Web monitor software 120 of FIG. 1 according to the embodiment of FIG. 1. In this example, there are three tiers at work. The first tier is the client browser 118 (*a-d*). The client browser downloads subcomponents or "client" modules from Web monitoring service 120 when the browser reads and executed the tracking code served in one or more of the enterprise Web pages served from the Web site or portal 103. A monitoring agent 202 is downloaded and is adapted to report any qualifying Web activities back to Web monitoring service 120. A client-side notification agent 203 is downloaded and is adapted to negotiate display of any proactive notifications or offers the customer receives while being monitored. A client-side engagement agent 204 is downloaded and adapted to initiate engagement between the client and the call center over some pre-defined channel like chat, email, SMS, or an inbound call. In the case of an inbound offer, the correct phone number or address is provided in the engagement window enabling the customer to dial into the call center and, if deemed appropriate, take a higher priority in queue or bypass the queue altogether.

Web monitoring server 119 is hosted in this example. Web monitoring service 120 has a direct network connection to a visitor's browser and monitoring agent 202. Each detectable Web event resulting from visitor activity at the site is forwarded from the visitor's browser to the Web monitoring service by monitoring agent 202. In the embodiment where Web monitoring service includes a filtering engine for insuring that events forwarded are relevant to business context, rules 123 may be provided locally to enable intelligent filtering of data not just from the online monitoring server, but also data from the customer intelligence server.

Event store can be utilized as a cache or queue to hold Web events temporarily before forwarding them to Web service. In one embodiment, as described elsewhere as well, Rules base 123 may be dynamic in the sense that customer identity may be used early on in monitoring to access a specific set of rules applying to a specific person, and those rules may be dynamic as well, in that they may e automatically or manually changed according to ongoing evolution in customer information and behavior.

Monitoring agent 202 sends events relative to visitor behavior at the site to Web monitoring service 120. Web monitoring service 120 uses configurable rules 123 to decide what events/information about the visitor's activities to send on to the call center. Web monitoring service 120 can be configured to send unmodified or raw browser events like "the visitor has clicked on button Y". In another embodiment, Web monitor 120 may be configured to send higher-level events based on the compilation of multiple browser events. For example, a user may add several items to a shopping cart and then pause for longer than anticipated. The High-level event may state the items in the cart and how long the pause time was. The Web monitoring service also includes the ID of the visitor in the event message sent to the call center.

Web gateway 102 includes the server-side counterparts to the components downloaded from service 120. Web gateway may be configurable in one embodiment. That is to say the amount of filtering intelligence and access to other sources of information may be programmed into Logic 205, which is analogous to logic 106. Logic 205 includes event logic for determining which actions to take based on an event, and engagement logic for determining the engagement details for that customer based on the event. Web gateway may also include a workflow engine for establishing a plan of proactive action for the customer. Web gateway 102 can be configured to make simple decisions like offer a Web chat id agents are determined to be ready for chat. However, in one embodiment, the gateway may forwards the event message on to a more powerful work engine.

Gateway 102 includes a notification service 206 that generates and sends notification messages to visitors and agents. Gateway 102 includes a Web engagement service 207 that paves the way for connecting the visitor to available services. In addition, Web gateway 102 may cause the browsing history of a customer who is not yet known to the system to be stored temporarily in a short-term data storage facility like event store 121. For visitors who are already known by the system, the most recent browsing history may be added to persistent information of the customer, which may include a customer profile and a rich interaction history with the call center.

In this example, Web gateway 102 and Web site 103 are hosted within the domain of the enterprise. This is not required in order to practice the present invention, as all of this equipment and software may be third-party equipment and software. The enterprise domain includes a Web-based application program interface (Web API) 208 that functions as an adaptor for otherwise disparate applications used in communications. For example, a chat request comes into a chat server 216 via the Web API 208. Contact center equipment and services 209 include a SIP server 210 for SIP communications. An orchestration server 211 for orchestrating workflow and agent assignment activities, a context server 212 for providing business context and customer information relative to that context, a statistics server 213 for providing current call center statistics to enable intelligent routing, a routing server 214 for routing interactions, notification messages, and customer information, agents 215 stationed in workstations and assigned call center duties, and a chat server for hosting chat sessions between agents and customers.

It is noted herein that call center equipment and services may vary widely from center to center and a call center adapted to practice the present invention may include more or less equipment and available services than what is illustrated in this example and in the example of FIG. 1 without departing from the spirit and scope of the present invention. In one embodiment, all of the functional components of the system may be loaded onto a single powerful server without departing from the spirit and scope of the present invention.

Monitoring agent 202 reports events directly to Web monitor service 120. Web monitor service 120 may store events in short-term storage in event store 121 or it may immediately pass events to Web gateway 102 in the enterprise domain. Logic 205 determines how an event will be handled. Utilizing the event data, the visitor's more recent history with the call center, and current call center statistics, the logic determines what if any proactive offers should be made to the visitor. In one embodiment two or three offers may be prepared by priority relative to likelihood the visitor will readily accept the offer. If the visitor is a hot lead, the first offer may be for a live conversation with an agent, bypassing queue. The next offer may to schedule a callback from a live agent, while the third offer might be to engage in a chat session with a live agent. If the visitor is a like warm lead, the offers may be customized accordingly such as offering a 10% discount, offering a redirection to a shopping cart facility on a transaction page, or offering to email the latest pricing for products and services, or for specific products of interest as determined through monitoring.

Notification service 206 in conjunction with the aid of Web engagement service 207 generates an appropriate notification containing an offer for the visitor and sends the notification to the visitor. Notification agent 203 receives and displays the message on the visitor's appliance display. Engagement agent 204 may define exactly how the call center will engage the visitor. This information will be subject of the notification made to the visitor. Engagement may also include chat, instant message (IM), SMS, and email as an alternative to voice interaction. Higher priority events may lead to live engagement offers while lower priority events may elicit a variety of options the visitor may elect from. More than one offer may be included in a single notification made to a visitor. In this case, the visitor may select an option that best fits the visitor's time schedule and preference model.

Notification service 206 also sends notification messages to agents and some automated systems where applicable. A notification message to an agent to accept a pending voice interaction with a monitored visitor is sent if the visitor has accepted an offer for voice contact. The message will notify the agent that the interaction is forthcoming. The visitor's identification and perhaps a summary of the visitor's current intent may be included in the message as well as the procedure for making contact. The agent may initiate contact with the visitor or the system may initiate contact with the visitor on behalf of the agent and may connect the two when the call legs are established for the connection. Pending events may also be queued for an agent such as a number of lower priority email response requests. These may be generated by the system and may be queued with a particular agent assigned to email duties at some point in the work shift. The email requests may be tagged as event-driven proactive leads and the visitor's history summary and any relevant business context information may be available through the agent's messaging interface.

The system may handle the lower level event-driven interactions without assistance from live personnel such as redirecting a visitor to a shopping page, providing an automated assistant for a visitor attempting to fill out a form, sending additional pricing information or product descriptions to visitors, and so on. Records of all of these interactions are kept as normal call center business transcripts and customer and business archives are updated accordingly after each interaction. As time progresses, visitor preference models evolve as they are updated with new information. Interactions resulting from event-driven proactive contact are tagged so they may be isolated from the general call center records for purposes of analysis by themselves and in light of other normal call center business.

Figure 3:
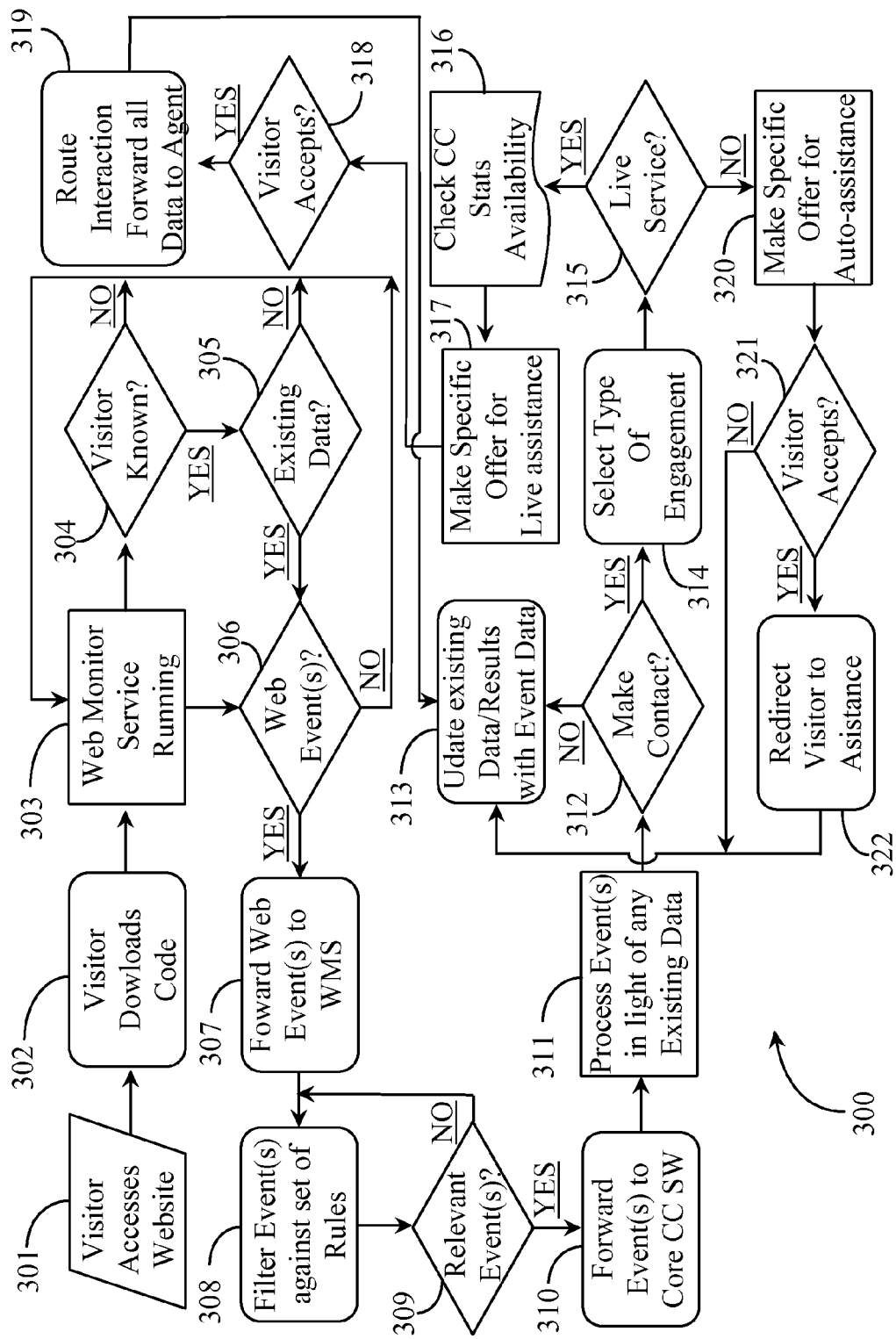
FIG. 3 is a process flow chart 300 illustrating steps for monitoring a Web visitor for possible proactive contact according to the embodiment of FIG. 1.

FIG. 3 is a process flow chart 300 illustrating steps for monitoring a Web visitor for possible proactive contact according to the embodiment of FIG. 1. At step 301, a visitor accesses a Web site containing tracking code. At step 302, the visitor's browser comes across the code executing it resulting in download of the client sub-modules like modules 203-204 of FIG. 2. At step 303, the Web monitor service is running and actively monitoring the visitor's behavior at the site. There are many possible classifications for Web events. Any activity on a tracked page may qualify as a potential event. In one embodiment two to several activities might be required to qualify as an event. For example one event may consist of the visitor clicking on a product price comparison widget followed by entering a product description followed by executing a search for comparably priced products. If the process is begun but not completed, it still may qualify as an event, but the priority of the event and the recommended handling of that event may be entirely different than it would be if the visitor completed the process.

At step 304, the system determines if the Web visitor is already known to the system. This might be determined through authentication, cookie exchange, or other known techniques. If the system determines that the visitor is new and not previously known in step 304, the process may resolve back to step 303 where Web monitoring of the visitor continues. If the visitor is identified and is known to the system, the system determines if there is any existing data maintained about that visitor. If the visitor is known but no data is available to the system about the visitor at step 305, then the process may resolve back to step 3 for continued monitoring.

At step 305, if there is data maintained in the call center about the visitor, the process moves to step 306 where the monitor application determines if there are any events for that visitor to report to the call center. In the case that the visitor was not known, meaning no data exists about that visitor (steps 304, 305), the process moves from step 303 to step 306. In either route, if there are no Web events detected for a visitor at step 306, the process resolves back to step 303 for continued monitoring as long as the visitor is on the site.

If the system determines that there is one or more Web events detected for a visitor, then at step 307 those events may be forwarded to the Web monitoring server (WMS) for disposition. In one aspect, the Web monitor service may filter incoming events from a visitor against a set of rules at step 308. In this aspect, the service may determine after filtering if there are relevant events for that visitor at step 309. Event relevancy may require that an event be directly relative to a business context like characterizing the visitor "a high probability for a sale" based on event relevancy analysis. In one aspect, step 308 may be performed later in the process.

If relevant or actionable events are determined for a visitor a step 309, then those events are forwarded to core contact center software for event processing. If the visitor is known, then that visitor's identification is tagged to each event. If the visitor ID is not known then a unique identifier may be assigned for that visitor. Such identification may be the serial number of the appliance used by the visitor, a session ID number, or some other generated identifier. At step 311, the core contact center software processes the received events in light of any pre-existing information maintained about that visitor. Weight in processing may be given to past account history, preference model, profile information, demographic information, and current activity on the site resulting from information gleaned through active monitoring, etc.

At step 312 the system determines if proactive contact is warranted in light of the process results of step 311. If the system determines no contact is warranted under the circumstances, the process may resolve to step 313 and the system simply updates any existing records with the event data showing the Web visitor's browsing behavior. If no record exists, a record may be established for that visitor and then purged later if the visitor does not visit again in a certain time period. The visitor information may be stored persistently in the hope that the visitor will return. If contact data was obtained during Web activities of the visitor, a lead might be generated for the purposes of later contact.

If the system recommends proactive contact at step 312, then the system determines the type of engagement that will be pursued at step 314. The system might make a determination at step 315 whether live service will be offered in the engagement of the visitor. In one aspect live service is determined at step 314 under type of engagement. At step 315, if the system does not recommend live engagement, then the process moves to step 320. At step 320, the system generates a specific offer for auto assistance that is tailored to what the system has determined the visitor might be amenable to. The offer may include a discount offer, a redirection to a shopping cart, or any other auto assisted service available.

The offer is displayed for the visitor by virtue of the notification agent downloaded to the visitor's Web browser. At step 321, the system determines if the visitor has accepted the offer sent by automated services. If the system determines at step 321 that the visitor has not accepted the offer, the system may try another offer or the process may resolve back to step 313 where the system updates any existing data with the visitor's latest activity. If the visitor is not in the system, a new record may be created for short-term or persistent storage. This data may be later mined for information to help improve the acceptance rate of typical offers sent to visitors. If the visitor accepts an offer at step 321, the system redirects the visitor to the automated assistance at step 322. After the session, the system updates existing records at step 313, or creates a new record for that visitor at step 313. The record includes the visitor ID, the visitor's browsing history, and any results from auto assistance provided to the visitor.

In one aspect of the process, an offer might contain a feature allowing the visitor to negotiate services. In this case a reply to an offer might request another offer. The system might make a determination then whether to compromise with the visitor or terminate the offer process, in which case an explanation for the termination of the process might be offered in a follow-up message.

At step 315, if the system recommends live engagement, the system checks call center status at step 316 to determine agent availability for the specified channel. A live engagement could be a live data session or chat, or a live voice session with an agent. In one aspect, the system may require a live agent to be available before making an offer for live assistance. That is to say that the offer would not be sent unless an agent has been reserved to handle the interaction. In another aspect, an offer might be made for live assistance where the visitor is queued for the next available agent upon acceptance. Priority queuing schemes may also be utilized as with any normal interactions.

At step 317, the system generates and sends a specific offer to the visitor for live assistance. At step 318, the system determines if the visitor has accepted the offer. For example, if the visitor clicks on the accept button of an interactive pop-up offer, the engagement agent in the visitor's browser handles the client-side aspect of the engagement. This may include invoking a communications application on the client machine to make way for a connection to the call center agent. If the visitor accepts the offer at step 318, the system generates an interaction request and routes the request to the available agent and forwards the most recent activity and history data about the visitor to the agent ahead of the pending interaction. The data may be organized by event including time tamped verification of the activities. Historical data about the visitor may be accessed in several different organizational views. The agent receives this data in an agent desktop interface or in a standalone graphics user interface (GUI) so the agent can order different views including accessing payment history, complaint history, product preferences both inferred and stated, and so on.

After the session established between the visitor and agent is completed, the system automatically updates any existing data with the results of the interaction and the most recent event activity. Modules within the data structure of the visitor's data store may include a product or service preference model indicating what the visitor has preferred in the way of products and services in the past. A preference model may include preferences in how the center interacts with a visitor. This model by change or evolve over time based on new input from visitor events and new interactions with the visitor. In one aspect, visitors who have registered relevant event but have not made any purchases might be added to an outbound calling campaign list for proactive sales contact at a later time.

In one more personalized embodiment an extra step is imposed after step 305 and before step 306. This extra step uses the established identity of the visitor to the site to access a set of personalized rules or an algorithm developed for that particular visitor. This step recognizes that not all visitors are equal, and certain behavior for a certain visitor may well have higher relevance than other behavior, and this will vary from visitor to visitor. One this rule set is established it is consulted in the following steps of monitoring and using information about the behavior.

Figure 4:
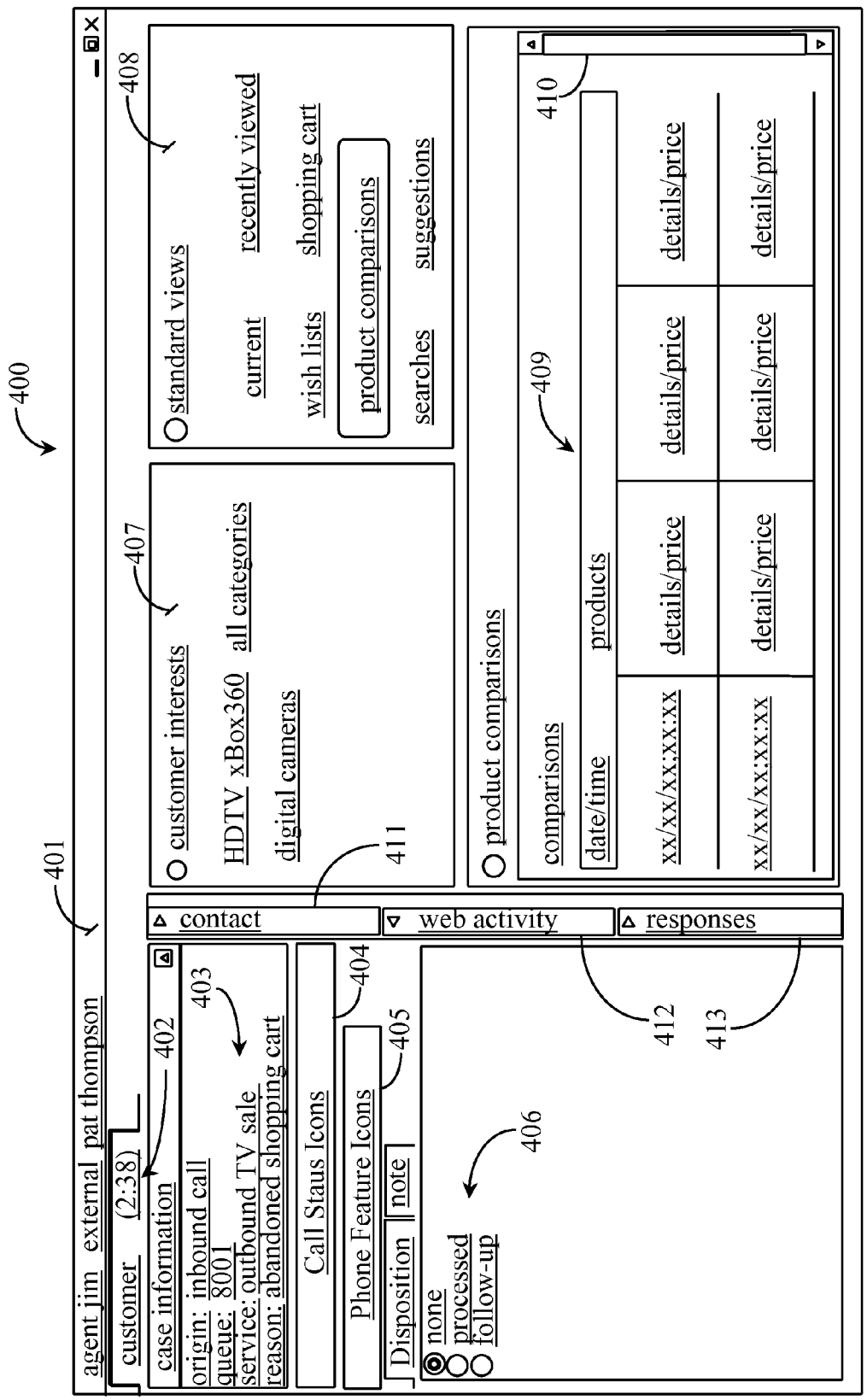
FIG. 4 is an exemplary screen shot of an agent user interface for receiving notifications and viewing customer data during interaction.

FIG. 4 is an exemplary agent user interactive interface 400 for receiving notifications and viewing customer data during interaction. Agent user interface is a browser-nested or browser-based interactive display in this example. In one embodiment, agent user interface 400 is a standalone application.

Interface 400 includes a title bar 401 that identifies the agent (agent Jim), the customer (Pat Thompson) and identifies the source as external from the call center. Interface 400 may open automatically when an agent notification of a pending interaction is received. Interface 400 includes data 402 indicating the time (2:38) the customer has spent waiting to be connected. Interface 400 includes a window displaying case information 403. In this example the case information includes origin of the interaction, the queue number of the queue that the interaction resides in, the type of service, in this case, an outbound television sales campaign, and the reason that the visitor was presented an offer (abandoned shopping cart with items inside).

Agent interface 400 includes call-status icons 404 representing the current status of the call. For example, caller: Pat Thompson; connection status: connected; session state: in progress, represent some call icons that are very useful features. Various telephone feature icons 405 like terminate call, place on hold, record, dial pad, redirect, etc. are provided for convenience of use. Agent interface 400 includes an indication of a transaction disposition code that the agent or the system may set for this record. At current state, the call is in progress with no final disposition. Other state indications include "processed" and "follow-up". An adjacent tab associated with call disposition enables the agent to ad notes to the interaction record.

Agent interface 400 includes a window 407 containing information about customer interests. In this example the interests of the current customer include a high definition television (HDTV), an xBox360, and the general category digital cameras. An option all categories expands the view to all of the customer's interests in the past association with the call center. Agent interface 400 includes a window 408 containing option for ordering standard views of customer information for the purpose of better handling that customer. Window 408 includes current view, recently viewed history, wish lists, shopping cart history, product comparison results, searches, and suggestions. Any selection made in window 408 for expansion of the view results in data 409. In this example, product comparisons are being reviewed as the agent and visitor converse. Data 409 is scrollable via scrollbar 410.

Other features include an expandable list of contacts 411, an expandable list of Web activities 412 for the user Pat Thompson, and an expandable list of responses 413 from the visitor. One with skill in the art will understand that UI 400 is generic to or customized to call center architecture. There may well be other Web or desktop interfaces known to the inventor that might be used in place of interface 400. Interface 400 enables the agent to quickly and efficiently review information about the customer's current and past activities as well as preferences, likes, and dislikes. Further, the agent may review recent transactions of the customer and any other information that may be compiled about that customer.

In one embodiment demonstration of features of web tracking by a system according to embodiments of the invention is provided by using a proxy to insert a script, at least temporarily, into a person's browser, thereby avoiding a necessity to alter a potential client's web site until and unless the client is satisfied that the service is worthwhile, after which appropriate code may be inserted into the source code in the web site.

It will be apparent to one with skill in the art that the proactive Web visitor interaction system of the invention may be provided using some or all of the mentioned features and components without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

What is claimed is:

1. A system for interacting with a person browsing a web site, the system comprising:
    a processor; and
    a memory coupled to the processor, wherein the memory has stored thereon, instructions that, when executed by the processor, cause the processor to:
        store first tracking rules associated with a pre-stored customer profile;
        store default tracking rules different from the first tracking rules;
        receive a signal indicating a visitor is browsing the web site;
        determine whether or not the visitor matches the pre-stored customer profile and monitor browser behavior based on either the first tracking rules or the default tracking rules according to whether or not the visitor matches the pre-stored customer profile;
        in response to determining the visitor matches the pre-stored customer profile, monitor browsing behavior of the visitor according to the first tracking rules associated with the pre-stored customer profile;
        in response to determining the visitor does not match the pre-stored customer profile, monitor the browsing behavior of the visitor according to the default tracking rules;
        adjust, while the visitor is browsing the website, the first tracking rules or the default tracking rules according to the browsing behavior; and
        initiate an invitation to the visitor to engage in a communication session with a contact center agent according to the browsing behavior.

2. The system of claim 1, wherein the instructions further cause the processor to determine whether or not the browsing behavior corresponds to predetermined criteria for initiating the invitation to the visitor to engage in the communication session with the contact center agent.

3. The system of claim 2, wherein the predetermined criteria comprises detecting the visitor abandoning a product purchase.

4. The system of claim 2, wherein the predetermined criteria comprises detecting the customer viewing a product on the web site.

5. The system of claim 1, wherein the instructions further cause the processor to transmit information regarding the pre-stored customer profile to an electronic device associated with the contact center agent.

6. The system of claim 5, wherein the information regarding the pre-stored customer profile comprises demographic information of the visitor.

7. The system of claim 5, wherein the information regarding the pre-stored customer profile comprises transaction history of the visitor.

8. The system of claim 1, wherein the instructions further cause the processor to transmit information regarding the browsing behavior of the visitor to an electronic device associated with the contact center agent.

9. The system of claim 1, wherein the instructions further cause the processor to:
    determine whether or not the browsing behavior of the visitor meets a criteria for a high probability for a sale; and
    initiate the invitation to engage in the communication session in response to determining that the browsing behavior of the visitor meets the criteria for the high probability for the sale.

10. The system of claim 1, wherein the instructions further cause the processor to store data corresponding to the browsing behavior in the memory.

11. A method for interacting with a person browsing a web site, the method comprising:
    storing, by a processor, first tracking rules associated with a pre-stored customer profile;
    storing, by the processor, default tracking rules different from the first tracking rules;
    receiving, by the processor, a signal indicating a visitor is browsing the web site;
    determining, by the processor, whether or not the visitor matches the pre-stored customer profile and monitor browser behavior based on either the first tracking rules or the default tracking rules according to whether or not the visitor matches the pre-stored customer profile;
    in response to determining the visitor matches the pre-stored customer profile, monitoring, by the processor, browsing behavior of the visitor according to the first tracking rules associated with the pre-stored customer profile;
    in response to determining the visitor does not match the pre-stored customer profile, monitoring, by the processor, the browsing behavior of the visitor according to the default tracking rules;
    adjusting, by the processor while the visitor is browsing the website, the first tracking rules or the default tracking rules according to the browsing behavior; and
    initiating, by the processor, an invitation to the visitor to engage in a communication session with a contact center agent according to the browsing behavior.

12. The method of claim 11, further comprising determining, by the processor, whether or not the browsing behavior corresponds to predetermined criteria for initiating the invitation to the visitor to engage in the communication session with the contact center agent.

13. The method of claim 12, wherein the predetermined criteria comprises detecting the visitor abandoning a product purchase.

14. The method of claim 12, wherein the predetermined criteria comprises detecting the customer viewing a product on the web site.

15. The method of claim 11, further comprising transmitting, by the processor, information regarding the pre-stored customer profile to an electronic device associated with the contact center agent.

16. The method of claim 15, wherein the information regarding the pre-stored customer profile comprises demographic information of the visitor.

17. The method of claim 15, wherein the information regarding the pre-stored customer profile comprises transaction history of the visitor.

18. The method of claim 11, further comprising transmitting, by the processor, information regarding the browsing behavior of the visitor to an electronic device associated with the contact center agent.

19. The method of claim 11, further comprising:
    determining, by the processor, whether or not the browsing behavior of the visitor meets a criteria for a high probability for a sale; and
    initiating, by the processor, the invitation to engage in the communication session in response to determining that the browsing behavior of the visitor meets the criteria for the high probability for the sale.

20. The method of claim 11, further comprising storing, by the processor, data corresponding to the browsing behavior in a memory.

\* \* \* \* \*